United States Patent
Blum et al.

(10) Patent No.: US 11,239,712 B2
(45) Date of Patent: Feb. 1, 2022

(54) STATOR OF AN ELECTRICAL MACHINE AND COOLING APPARATUS FOR SAME

(71) Applicant: Bayerische Motoren Werke Aktiengesellschaft, Munich (DE)

(72) Inventors: Julian Blum, Munich (DE); Victor Heffner, Munich (DE); Andreas Huber, Schoenberg (DE); Markus Lang, Munich (DE); Martin Lasch, Freising (DE); Manfred Siegling, Munich (DE); Holger Ulbrich, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 147 days.

(21) Appl. No.: 16/733,318

(22) Filed: Jan. 3, 2020

(65) Prior Publication Data

US 2020/0185985 A1 Jun. 11, 2020

Related U.S. Application Data

(63) Continuation of application No. PCT/EP2018/067765, filed on Jul. 2, 2018.

(30) Foreign Application Priority Data

Jul. 4, 2017 (DE) ...................... 10 2017 211 317.0

(51) Int. Cl.
*H02K 1/20* (2006.01)
*H02K 1/16* (2006.01)
(Continued)

(52) U.S. Cl.
CPC ............... *H02K 1/20* (2013.01); *H02K 1/165* (2013.01); *H02K 3/12* (2013.01); *H02K 3/24* (2013.01); *H02K 3/48* (2013.01); *H02K 7/006* (2013.01)

(58) Field of Classification Search
CPC .. H02K 1/16; H02K 3/12; H02K 3/24; H02K 3/48; H02K 7/00; H02K 9/16; H02K 1/20;
(Continued)

(56) References Cited

U.S. PATENT DOCUMENTS 5,973,427 A * 10/1999 Suzuki ..................... H02K 9/19
310/52
9,742,243 B2 * 8/2017 Fairall ...................... H02K 5/20
(Continued)

FOREIGN PATENT DOCUMENTS

CN 102780289 A 11/2012
CN 103840569 A 6/2014
(Continued)

OTHER PUBLICATIONS

Chinese-language Office Action issued in Chinese Application No. 201880042886.2 dated Jan. 5, 2021 with English translation (14 pages).
(Continued)

*Primary Examiner* — Naishadh N Desai
(74) *Attorney, Agent, or Firm* — Crowell & Moring LLP

(57) ABSTRACT

A stator for an electrical machine, in particular for an electromotive drive machine for an electric or hybrid vehicle, includes a stator core stack with a stator yoke and a number of radial stator teeth, as well as a corresponding number of stator slots, arranged between the stator teeth, for receiving a stator winding. A cooling apparatus has a number of cooling channels, each of which runs axially in one of the stator slots.

20 Claims, 5 Drawing Sheets

(51) Int. Cl.
*H02K 3/12* (2006.01)
*H02K 3/24* (2006.01)
*H02K 3/48* (2006.01)
*H02K 7/00* (2006.01)

(58) Field of Classification Search
CPC .......... H02K 9/00; H02K 1/165; H02K 7/006; H02K 3/487; H02K 9/19
See application file for complete search history.

(56) References Cited

U.S. PATENT DOCUMENTS

| | | |
|---|---|---|
| 2005/0012409 A1 | 1/2005 | Philippart |
| 2007/0035187 A1* | 2/2007 | Verhaegen ............... H02K 3/24 310/59 |
| 2010/0176669 A1 | 7/2010 | Houle et al. |
| 2010/0207465 A1* | 8/2010 | Dutau ...................... H02K 1/20 310/64 |
| 2011/0133580 A1* | 6/2011 | Sugimoto ............. B60L 3/0061 310/54 |
| 2011/0181130 A1* | 7/2011 | Yoshida ............... H02K 41/031 310/12.29 |
| 2012/0286597 A1 | 11/2012 | Gundtoft et al. |
| 2013/0113311 A1* | 5/2013 | Downing ................ H02K 1/32 310/59 |
| 2014/0139057 A1 | 5/2014 | Ho et al. |
| 2015/0244223 A1* | 8/2015 | Lee ........................ H02K 3/24 310/54 |
| 2016/0226327 A1* | 8/2016 | Rippel .................... H02K 1/20 |
| 2017/0063200 A1 | 3/2017 | Tremelling et al. |
| 2017/0194838 A1* | 7/2017 | Marvin .................... H02K 3/24 |
| 2018/0054094 A1* | 2/2018 | Dlala ....................... H02K 9/19 |
| 2018/0054095 A1* | 2/2018 | Dlala ....................... H02K 1/16 |
| 2018/0054096 A1* | 2/2018 | Dlala ....................... H02K 1/20 |
| 2018/0054097 A1* | 2/2018 | Dlala ................... H02K 15/024 |
| 2018/0337568 A1 | 11/2018 | Dorfner et al. |
| 2019/0020231 A1* | 1/2019 | Dlala .................... H02K 1/165 |

FOREIGN PATENT DOCUMENTS

| | | |
|---|---|---|
| DE | 198 13 160 A1 | 11/1998 |
| DE | 10 2015 012 913 A1 | 4/2017 |
| EP | 1 404 002 A1 | 3/2004 |
| EP | 2 003 764 A2 | 12/2008 |
| EP | 3 029 807 A1 | 6/2016 |
| EP | 3 142 225 A1 | 3/2017 |
| GB | 2505909 A | 3/2014 |

OTHER PUBLICATIONS

International Search Report (PCT/ISA/210) issued in PCT Application No. PCT/EP2018/067765 dated Nov. 27, 2018 with English translation (seven pages).

German-language Written Opinion (PCT/ISA/237) issued in PCT Application No. PCT/EP2018/067765 dated Nov. 27, 2018 (six pages).

German-language Search Report issued in counterpart German Application No. 10 2017 211 317.0 dated Apr. 25, 2018 with partial English translation (12 pages).

* cited by examiner

STATOR OF AN ELECTRICAL MACHINE AND COOLING APPARATUS FOR SAME

CROSS REFERENCE TO RELATED APPLICATIONS

This application is a continuation of PCT International Application No. PCT/EP2018/067765, filed Jul. 2, 2018, which claims priority under 35 U.S.C. § 119 from German Patent Application No. 10 2017 211 317.0, filed Jul. 4, 2017, the entire disclosures of which are herein expressly incorporated by reference.

BACKGROUND AND SUMMARY OF THE INVENTION

The invention relates to a stator for an electric machine, in particular for driving an electric or hybrid vehicle. The invention furthermore relates to a cooling apparatus for such a stator and to an electric machine having such a stator and having such a cooling apparatus.

An electric machine, such as for example an electric or electromotive drive machine, usually has an electric motor, which for its part typically has a stator provided with a stator winding (rotating-field winding) and a rotor mounted so as to be rotatable about a motor axis, which generates a static magnetic field by means of permanent magnets, for example. During operation of the electric motor, in which an electric alternating current flows through the stator winding, which is therefore energized, the rotor rotates in a magnetic rotating field generated by the stator or the stator winding thereof.

When such a drive machine is used in an electrically or electromotively operated or driven vehicle (electric or hybrid vehicle), it is typically necessary to cool the stator and/or the rotor by way of a gaseous or liquid coolant (cooling medium) in order to ensure the desired long-term efficiency for such vehicle applications.

To cool the stator, it is possible, for example, to arrange what is known as a water or coolant jacket as a cooling apparatus on the outer circumference of the stator. Such a jacket cooling apparatus has the disadvantage that it cools the stator only from the outside, that means in the region of the outer circumference thereof. In this case, the problem of the stator winding and/or the rotor not being cooled to a sufficient extent arises.

Furthermore, cooling apparatuses are known in which a coolant, in particular a motor or transmission oil, is applied to the stator and/or the rotor during operation of the electric motor. Such direct cooling (oil spray cooling) requires additional components of the machine, such as for example an oil cooler and/or an oil pump, as a result of which additional costs and an increased installation space requirement arise. Furthermore, cooling apparatuses in which the lines forming the stator winding are embodied as pipe-like or pipe-shaped waveguides, through which a coolant flows during operation, are contemplated. As a result, the winding density of the stator windings is reduced, which has a disadvantageous effect on the performance of the electric machine.

In order to dissipate the waste heat from a stator designed as a (stator) laminated core with individual laminations, it is known from EP 2 003 764 A2 to introduce a number of axially running cooling channels into the laminated core. The cooling channels are coupled to one another in terms of flow technology on the opposite stator face sides by way of annular or crown-like distributor structures and a coolant flows through said cooling channels. In this case, for example, the cooling channels are introduced in a stator yoke of the laminated core. In such a cooling apparatus for a stator of an electric motor, it is disadvantageous that the stator winding and, in particular, the rotor are not cooled to a sufficient extent. Furthermore, the magnetic properties of the stator are disadvantageously reduced due to the introduction of the cooling channels into the laminated core.

The invention is based on the object of providing a particularly suitable stator for an electric machine, in particular for an electromotive drive machine for an electric or hybrid vehicle. Furthermore, a suitable cooling apparatus for such a stator and an electric machine having such a stator as well as a motor vehicle, which has a drive machine with improved stator cooling, are intended to be specified.

The object is achieved by a stator, by a cooling apparatus for a stator, by an electric machine having the stator and cooling apparatus, and by a motor vehicle having such an electric machine, in accordance with the claimed invention. Here, the statements in connection with the stator also apply accordingly to the cooling apparatus, to the electric machine, and to the motor vehicle, and vice versa.

The stator according to the invention is suitable and configured for an electric machine, in particular for an electric or electromotive drive machine for an electric or hybrid vehicle. To this end, the stator has a stator laminated core having a stator yoke and having a number of radially oriented stator teeth. In this case, the stator laminated core has a corresponding number of stator slots between the stator teeth to receive a stator winding or rotating-field winding. The stator may also have a bevel. A cooling apparatus having a number of cooling channels (coolant channels) is furthermore provided. In this case, the cooling channels are each arranged so as to run at least substantially axially in one of the stator slots. During operation, a gaseous or liquid coolant flows through the cooling channels. Here, the coolant absorbs heat from the stator and dissipates it to the outside. For this purpose, the cooling channels are expediently produced from a thermally conductive material and preferably have the lowest possible (channel) wall thickness, with the result that effective heat exchange or heat transfer between the guided coolant and the respective environment of the cooling channel is ensured. As a result thereof, efficient and reliable cooling of the stator is ensured, as a result of which the lifetime and performance of the stator is substantially improved.

In contrast to the prior art, the cooling channels are therefore arranged not inside the stator laminated core but rather outside, in particular in the free spaces, which are formed by the stator slots, between two respective adjacent stator teeth. As a result, the magnetic properties of the stator laminated core or of the stator are not disadvantageously influenced by the cooling channels. Since during electromotive operation heat develops in the region of the stator winding, the arrangement of the cooling channels according to the invention ensures that the stator is cooled to a sufficient extent in this region. Furthermore, the arrangement of the cooling channels in the stator slots does not bring about an additional installation space requirement of the stator.

In an advantageous development, the cooling channels of the cooling apparatus are produced from a thermally conductive and electrically non-conductive material, in particular a ceramic or a ceramic material or a plastic, preferably a glass fiber reinforced plastic (GRP). On account of the electrically non-conductive, in particular non-magnetic, embodiment of the cooling channels, it is ensured that no electric leakage currents are induced during the electromotive operation, in which the stator winding generates a magnetic rotating field. In other words, the cooling channels therefore do not cause undesired power losses in the stator.

In an expedient configuration, the cooling channels of the cooling apparatus are coupled to the respective stator teeth in a thermally conductive manner by means of a potting compound. In other words, a respective gap region in the stator slot between the cooling channel and a stator tooth is at least partly filled by the potting compound. In this case, it is preferably contemplated, for example, for the respective cooling channel in the stator slot to also be connected to the stator winding in a thermally conductive manner by the potting compound. This improves the effected cooling power of the cooling apparatus during operation of the stator.

The cooling apparatus has at least one collector ring, in a preferred configuration two single-piece collector rings (end ring, distributor ring), which are arranged on the opposite face sides of the stator laminated core. The circular or crown-like collector rings couple the cooling channels arranged between them to one another in terms of flow technology. The collector rings and the cooling channels therefore form an approximately cage-like or cage-shaped cooling apparatus of the stator. This ensures particularly uniform and efficient cooling of the stator.

In a suitable configuration, one of the collector rings has an inlet for coupling in terms of flow technology to a coolant supply line for supplying with the coolant or the cooling medium. The collector ring arranged opposite accordingly has an outlet for discharging the coolant. By way of the collector rings, the fed coolant is distributed substantially equally across all cooling channels and discharged again. This ensures reliable dissipation of the heat produced during operation within the stator.

In an alternative embodiment, it is likewise contemplated, for example, for the cooling channels to be contact-connected in terms of flow technology by means of hollow spaces or coolant conducting structures of a stator housing or motor housing provided for this purpose. In addition or as an alternative, it is possible for the cooling apparatus to have in addition to the cooling channels in the stator slots a coolant jacket on the outer circumference of the stator laminated core, wherein the cooling channels and the coolant jacket are coupled to one another in terms of flow technology. As a result, particularly reliable and effective cooling of the stator is possible.

In an expedient design, the collector rings each have an annular body having an integrated collector channel and a number of axially integrally formed connecting receptacles corresponding to a number of coolant channels. The collector channels of the collector rings are therefore arranged in an encircling manner in the region of the opposite end sides of the cooling channels. In this case, the end sides of the cooling channels are coupled to the respective collector channel in terms of flow technology by means of the connecting receptacles. This means that the cooling channels are arranged parallel to one another in terms of flow technology between the collector channels. In other words, the collector channels and the cooling channels form a substantially closed coolant system for guiding the coolant. This ensures a uniform distribution and guidance of the coolant in a constructively simple manner. This consequently advantageously translates to cooling of the stator.

In the assembled state, the collector rings are arranged on the opposite face sides of the stator laminated core. This means that the annular bodies are arranged substantially in the region of the end windings of the stator winding and/or of an end shield. The coolant flows through the collector channels integrated into the annular bodies of the collector rings during operation. This effects an additional cooling effect of the cooling apparatus in the region of the end windings and/or of the end shield.

In an expedient development, the cooling channels are joined on the end side to connecting receptacles of the collector rings. The cooling channels are thus, for example, soldered or adhesively bonded on the end side to the connecting receptacles. The cooling channels are preferably inserted into the connecting receptacles. As a result, expedient securing and coupling that are reduced in terms of outlay during assembly are realized.

The seal-tightness of the cooling apparatus for preventing coolant leaks is ensured, for example, by way of a press-fit assembly of the cooling channels in the connecting receptacles or by use of a potting or an adhesive. In a particularly coolant-tight configuration, at least one sealing element is provided between the collector rings and cooling channels. In this case, a respective sealing element is suitably arranged between an end side of a coolant channel and an inner wall of a corresponding connecting receptacle of a collector ring. In this case, the sealing elements are designed, for example, as sealing rings or sealing hoses. This advantageously and easily counteracts an undesired escape of coolant in the stator.

The collector rings are suitably embodied in one piece. However, a collector ring may also be made of several pieces. For example, in an alternative embodiment of the cooling apparatus, each two of the cooling channels can be connected in terms of flow technology in pairs to a collector ring on a face side by means of a deflection body. In this case, the deflection bodies have plug receptacles for forming a plug connection with the cooling channels. In order to prevent coolant leaks, a sealing element is provided here between the cooling channels and the plug receptacles. Alternatively, the cooling channels are connected to the plug receptacles of the corresponding deflection body by means of a press-fit assembly or by means of an adhesive.

On the opposite face side, a respective cooling channel of the cooling channels connected in pairs is then connected, for example by means of a hose, to an intake for the coolant from a coolant circuit of the motor vehicle and the respective other cooling channel of the cooling channels connected in pairs is connected to an outlet for the coolant to the coolant circuit. In other words, the coolant is accordingly fed to or discharged from the cooling channels only at a face side. This makes possible, in particular, an alternative embodiment for the connection of the cooling apparatus to the coolant circuit, which can better satisfy an installation space requirement of the electric machine.

The deflection bodies have a collector channel through which coolant flows during operation of the cooling apparatus and, for example, a shape such that the deflection bodies at least partly cover the corresponding face side. In addition, the hoses are arranged on the corresponding face side in a suitable manner, with the result that the end windings of the stator winding are cooled by means of the hoses or deflection bodies through which coolant flows. In this embodiment, the deflection bodies together form the collector ring there at the corresponding end side of the stator.

In a suitable embodiment, the cooling channels have a circular cross-sectional shape. In this case, the cooling channels preferably bear at least in sections in the region of their respective outer circumference against the stator teeth of the respective stator slot and/or the stator winding arranged therein. In this case, the cooling channels preferably have the lowest possible wall thickness, with the result that a particularly effective heat exchange takes place between the stator teeth and the coolant within the cooling channel.

In an advantageous development, the cooling channels are guided to a rotor side of the stator laminated core in a manner radially offset to the stator winding. The rotor side is to be understood as meaning, in particular, the surface of the stator or of the stator laminated core that faces toward a rotor in an assembled or installed situation. In other words, the cooling channels are arranged in the region of an air gap or a pole shoe of the stator laminated core. This means that the cooling channels are arranged in the case of an inner rotor radially on the inside in the stator slots of the stator laminated core, with the result that the rotor is surrounded substantially in the manner of a cage by the cooling apparatus. In the case of an outer rotor, the cooling channels are accordingly arranged radially on the outer side of the stator laminated core. As a result, the cooling channels are arranged close to the rotor in an installed or assembled situation. As a result, the rotor is cooled during electromotive operation by means of the coding apparatus of the stator by means of an air gap and/or the resulting cooler ambient air of the stator.

The cooling apparatus according to the invention is suitable and configured for a stator described above. In this case, the cooling apparatus has a number of cooling channels, which in the assembled state are each arranged so as to run axially in a stator slot. As a result, a particularly efficient cooling apparatus that is compact in terms of installation space is realized.

The electric machine according to the invention is designed, in particular, as an electromotive drive machine for an electrically driven or drivable motor vehicle, in particular an electric or hybrid vehicle. The electric machine is embodied, for example, as an asynchronous machine with a brushless electric motor having a stator and having a rotatably mounted rotor. In this case, the stator is provided with a cooling apparatus described above. As a result, a particularly suitable electric machine, which is improved with respect to the lifetime and running time thereof, is realized.

In a preferred application, the electric drive machine is part of a motor vehicle, in particular an electrically or electromotively operated or driven motor vehicle. The motor vehicle is, in particular, an electric or hybrid vehicle, wherein at least one of the vehicle axles thereof is driven by the electric drive machine.

Other objects, advantages and novel features of the present invention will become apparent from the following detailed description of one or more preferred embodiments when considered in conjunction with the accompanying drawings.

Parts and sizes corresponding to one another are always provided with the same reference signs in all of the figures.

DETAILED DESCRIPTION OF THE DRAWINGS

Figure 1:
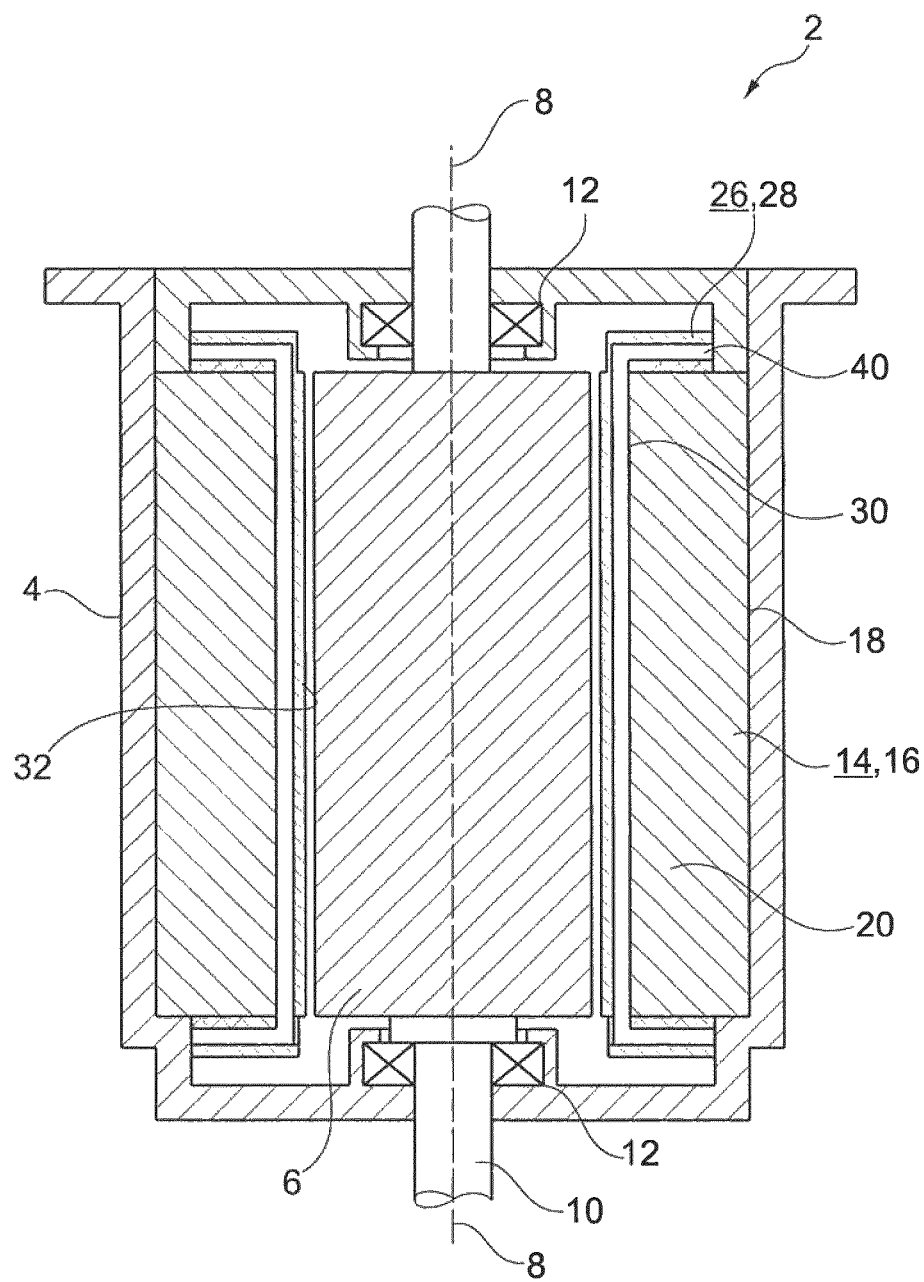
FIG. 1 is a schematic sectional illustration of an electric motor having a stator having a cooling apparatus.

The electric machine 2 illustrated in FIG. 1 is an electromotive drive machine of an electric or hybrid vehicle, in particular for a traction application. To this end, the electric machine 2 is expediently configured as an asynchronous machine and integrated within a drivetrain of the electric or hybrid vehicle. The electric machine 2 comprises a (motor) housing 4, in which a rotor 6 is mounted so as to be rotatable around a rotary or motor axis 8.

The rotor 6 is arranged fixedly on a rotor shaft or motor shaft 10, which is mounted by use of two bearings 12 at the opposite face sides of the housing 4, relative to said housing. The rotor 6 is surrounded, within the housing, by a stator 14. The stator 14 comprises a stator pack or stator laminated core 16 having a surrounding, circular stator yoke 18. In this case, the stator yoke 18 has a number of radially running stator teeth 20 attached on the inner circumferential side. A respective axially running stator slot 22 is formed between two adjacent stator teeth 20, which run, in particular, substantially parallel to the motor axis 8 (FIGS. 3A-3D).

In the assembled state, a distributed rotating-field or stator winding 24 is placed in the stator slots 22, said winding being illustrated only schematically in FIGS. 3A to 3D. During (electromotive) operation of the electric machine 2, the stator winding 24 is supplied with a polyphase rotary electric current. As a result, the stator winding 24 generates a magnetic rotating field, in which the rotor 6, in particular provided with permanent magnets, rotates about the rotor axis 8. The rotary current produces during operation inter alia a power loss of the stator winding 24 in the form of heat development.

Figure 2:
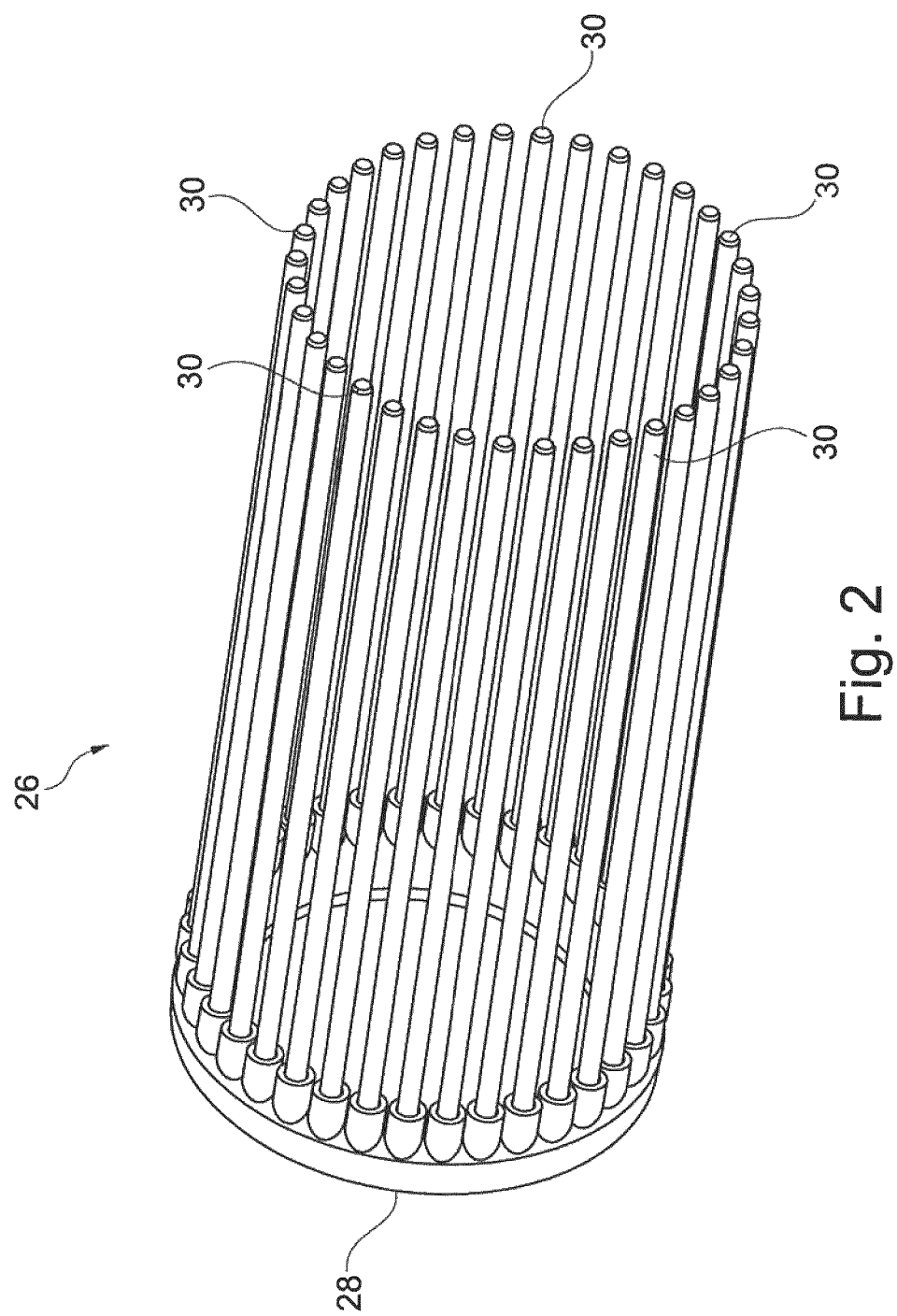
FIG. 2 is a perspective illustration of a detail of the cooling apparatus having a collector ring and a number of cooling channels.

To cool the electric machine 2, the stator 14 is provided with a cooling apparatus 26. The cooling apparatus 26 illustrated in detail in FIG. 2 comprises two circular or crown-like collector rings (end rings, distributor rings) 28, which are arranged on the face side of the stator laminated core 16 and of which only one is illustrated by way of example in FIG. 2. A number of cooling channels 30 are arranged between the collector rings 28 arranged on the face side. In the exemplary embodiment illustrated in FIG. 2, the cooling apparatus 26 has 36 individual cooling channels. As is illustrated schematically in FIGS. 3A to 3D, the cooling channels 30 are guided here so as to run axially in the stator slots 22 in the assembled state. In the figures, the cooling channels 30 are provided with reference signs purely by way of example.

The cooling channels 30 are embodied so as to be hollow, that means substantially in the manner of a tube or pipe, in order to guide a coolant or cooling medium. In the assembled state, an approximately cage-like arrangement of the cooling channels 30 and of the collector rings 28 is therefore formed around the rotor 6. In this case, the collector rings 28 are connected to a coolant circuit of the motor vehicle in a manner not illustrated in any more detail.

Exemplary embodiments of the cooling channels 30 are described in more detail below based on FIGS. 3A, 3B, 3C and 3D.

Figure 3A:
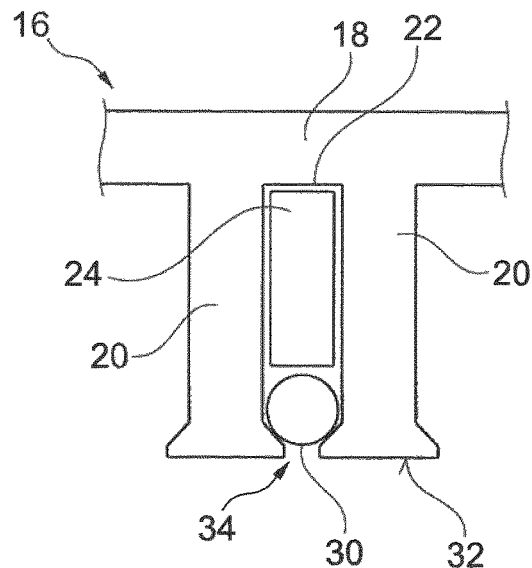
FIGS. 3A to 3D show schematic sectional illustrations of different embodiments of the cooling channels.

FIG. 3A shows a detail of the stator laminated core 16 having the stator yoke 18 and two radially inwardly oriented stator teeth 20. The stator winding 24 is arranged in the stator slot 22 between the stator teeth 20. The cooling channel 30 is arranged radially inside with respect to the stator winding 24, that means offset to a rotor side 32 of the stator 14. In this case, the cooling channel 30 is arranged at least partly in a pole-shoe-side gap region 34. In the exemplary embodiment of FIG. 3A, the cooling channel 30 has a substantially circular cross-sectional shape. In this case, the cooling channel 30 bears on the outer circumferential side at least partly against the adjacent stator teeth 20 of the stator slot 22.

Figure 3B:
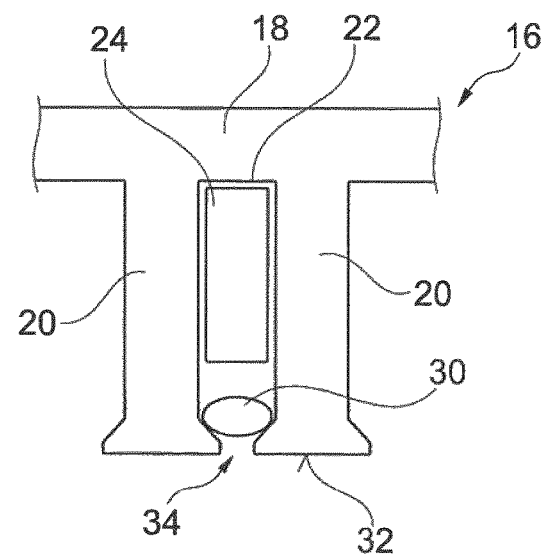

In the exemplary embodiment of FIG. 3B, a cooling channel 30 having a substantially oval or elliptical cross-sectional shape is illustrated. As a result, the cooling channel 30 effectively has an increased contact surface to the stator teeth 20.

Figure 3C:
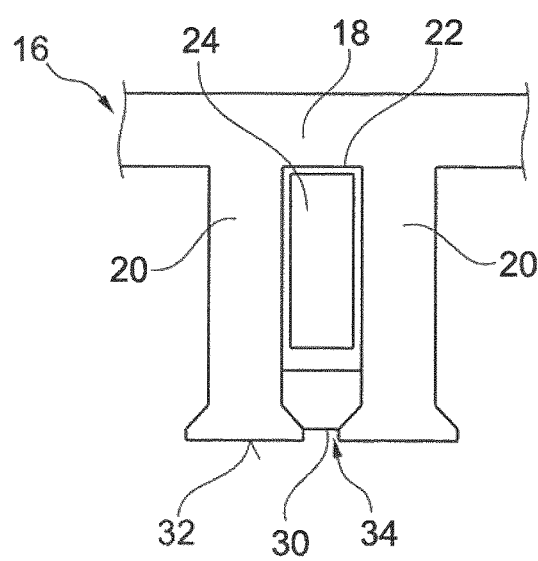

The exemplary embodiment of FIG. 3C in this case shows a cooling channel 30, the cross-sectional shape of which is embodied to be complementary to the geometry formed in the gap region 34 of the stator slot 22. In this case, the cooling channel 30 has a polygonal, in particular hexagonal, cross-sectional shape. Therefore, the cooling channel 30 bears along the radially oriented side faces thereof substantially over the full surface of the stator teeth 20. A particularly large-area contact surface for heat exchange or heat transfer is therefore formed, which advantageously translates to the cooling power of the cooling apparatus 26.

Figure 3D:
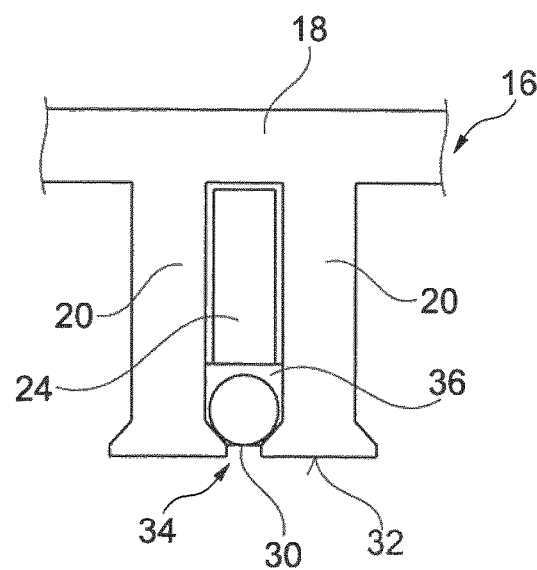

FIG. 3D essentially shows a circular embodiment of the cooling channel 30 according to FIG. 3A, wherein the cooling channel 30 is additionally thermally contact-connected in the stator slot 22 to a thermally conductive adhesive or potting compound 36. In this case, the potting compound 36 produces thermally conductive contact between the outer circumference of the cooling channel 30 and the stator teeth 20 and the stator winding 24. Furthermore, the cooling channel 30 is therefore secured within the stator slot 22 in terms of its position and orientation.

Figure 4:
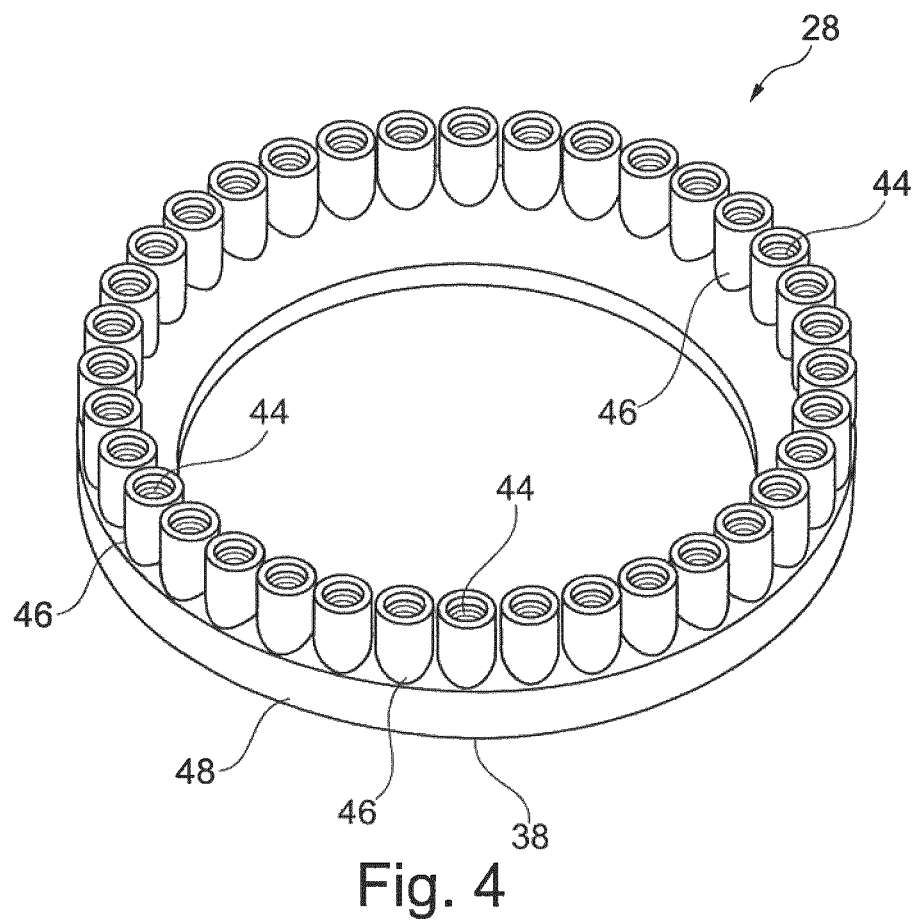
FIG. 4 is a perspective illustration of the collector ring.
Figure 5:
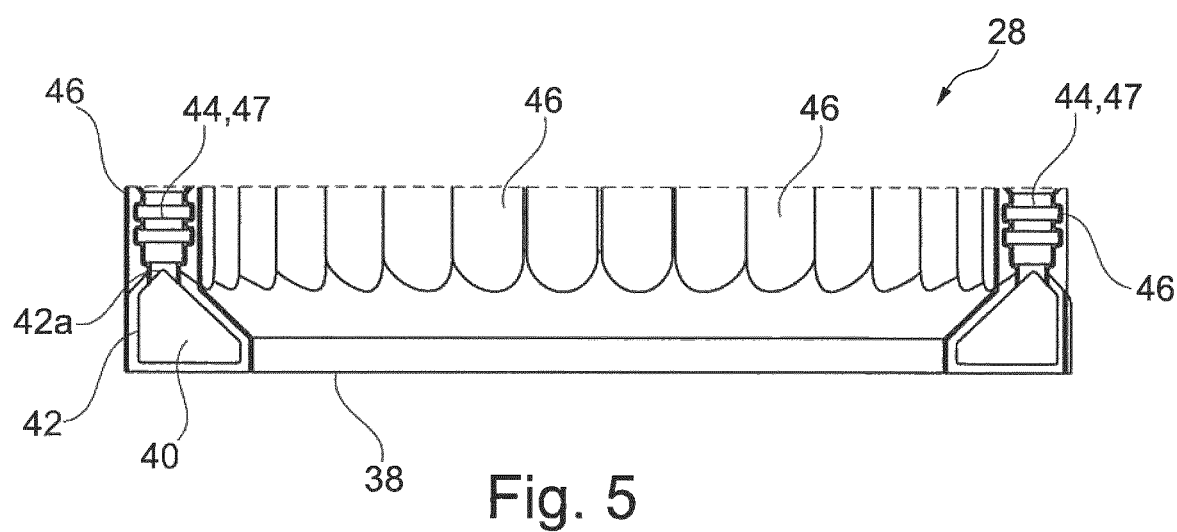
FIG. 5 is a sectional illustration of the collector ring.
Figure 6:
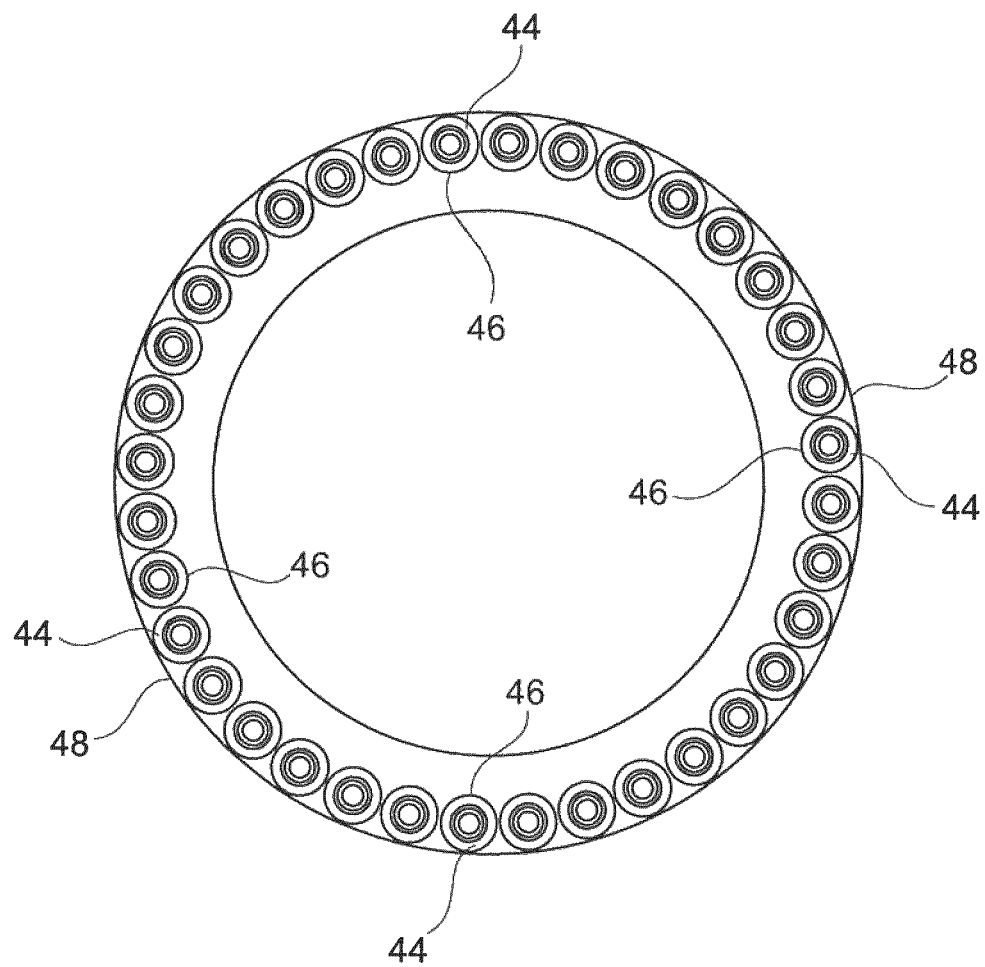
FIG. 6 is a plan view of the collector ring.

The design of the collector ring 28 is explained in more detail below based on FIG. 4, FIG. 5 and FIG. 6.

The collector ring 28 has an annular body 38 having an integrated collector channel 40. The approximately circular collector channel 40 runs here in a circumferentially closed manner in the annular body 38. As can be seen, in particular, in the sectional illustration of FIG. 5, the collector channel 40 has a substantially polygonal (channel) cross-sectional shape 42. The cross-sectional shape 42 is in this case of pentagonal embodiment, wherein a funnel-like tapering portion is provided along the axial direction in a corner region 42a facing the cooling channels 30. The corner region 42a opens here into a connection region 44 of an associated connecting receptacle 46. In this case, a number of connecting receptacles 46 corresponding to the number of cooling channels 30 is integrally formed in one piece, that is to say in one part or monolithically, in a manner axially projecting from the annular body 38 of the collector ring 28. For assembly, the cooling channels 30 are plugged at their respective face-side end sides (connection sides) into a respective connecting receptacle 46 of the collector rings 28 and therefore plug-connected in a coolant-tight manner. A respective sealing element 47, in particular a sealing ring (O-ring), is preferably arranged in the respective connection regions 44 of the connecting receptacles 46.

Two diametrically opposite joining extensions 48 are integrally formed so as to radially project from the outer circumference of the annular body 38. The joining extensions 48 engage in the assembled state suitably into correspondingly axially introduced joining receptacles on the housing inner wall of the housing 4. By way of the joining extensions 48, protection against rotation of the cooling apparatus 26 in the housing 4 is therefore realized, as a result of which assembly is simplified.

The invention is not restricted to the exemplary embodiments described above. Rather, other variants of the invention may also be derived therefrom by a person skilled in the art without departing from the subject matter of the invention. In particular, it is furthermore the case that all individual features described in conjunction with the exemplary embodiments may also be combined with one another in some other way without departing from the subject matter of the invention.

LIST OF REFERENCE SIGNS

2 Machine
4 Housing
6 Rotor
8 Motor axis
10 Motor shaft
12 Bearing
14 Stator
16 Stator laminated core
18 Stator yoke
20 Stator tooth
22 Stator slot
24 Stator winding
26 Cooling apparatus
28 Collector ring
30 Cooling channel
32 Rotor side
34 Gap region
36 Potting compound
38 Annular body
40 Collector channel
42 Cross-sectional shape
42a Corner region
44 Connection region
46 Connecting receptacle
47 Sealing element/ring
48 Joining extension The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A stator for an electric machine, comprising:
    a stator laminated core having a stator yoke and a number of radially oriented stator teeth, wherein a corresponding number of stator slots are arranged between the stator teeth to receive a stator winding; and
    a cooling apparatus having a number of cooling channels, which cooling channels are each arranged so as to run axially in one of the stator slots,
    wherein each of the stator slots comprises a narrowed section that is configured to hold a respective one of the cooling channels.

2. The stator according to claim 1, wherein
    the stator is an electromotive drive machine stator for an electric or hybrid vehicle.

3. The stator according to claim 1, wherein
    the cooling channels of the cooling apparatus are made of a thermally conductive and electrically non-conductive material.

4. The stator according to claim 3, wherein the cooling channels are made of a ceramic or a plastic.

5. The stator according to claim 3, wherein the cooling channels are made of a glass fiber reinforced plastic.

6. The stator according to claim 1, wherein the cooling channels of the cooling apparatus are coupled to the stator teeth in a thermally conductive manner by a potting compound.

7. The stator according to claim 1, wherein the cooling apparatus has at least one collector ring, wherein the collector ring couples the coolant channels to one another in terms of flow technology.

8. The stator according to claim 7, wherein the collector ring is also coupled to cool stator-face-side end windings.

9. The stator according to claim 7, wherein the collector ring has an annular body with an integrated collector channel and a number of axially integrally formed connecting receptacles corresponding to the number of coolant channels for the purpose of coupling the cooling channels to the respective collector channel in terms of flow technology.

10. The stator according to claim 9, wherein the coolant channels are joined on the end side to the connecting receptacles of the collector ring.

11. The stator according to claim 7, wherein at least one sealing element is provided between the collector ring and the coolant channels.

12. The stator according to claim 1, wherein the cooling apparatus has two single-piece collector rings arranged respectively on opposite face sides of the stator laminated core, wherein each collector ring couples the coolant channels to one another in terms of flow technology.

13. The stator according to claim 12, wherein each collector ring has an annular body with an integrated collector channel and a number of axially integrally formed connecting receptacles corresponding to the number of coolant channels for the purpose of coupling the cooling channels to the respective collector channel in terms of flow technology.

14. The stator according to claim 13, wherein the coolant channels are joined on the end side to the connecting receptacles of each collector ring.

15. The stator according to claim 12, wherein at least one sealing element is provided between each collector ring and the coolant channels.

16. The stator according to claim 1, wherein the coolant channels have a circular cross-sectional shape.

17. The stator according to claim 1, wherein the coolant channels are guided to a rotor side of the stator laminated core in a manner radially offset to the stator winding.

18. A cooling apparatus for a stator of an electric machine having a stator laminated core with a stator yoke and a number of radially oriented stator teeth between which stator slots are arranged to receive a stator winding, the coolant apparatus comprising:
a number of cooling channels configured in a manner such that, when assembled together with the stator, each cooling channel extends axially in a respective one of the stator slots,
wherein each of the stator slots comprises a narrowed section that is configured to hold a respective one of the cooling channels.

19. An electric machine for an electric or hybrid vehicle, the electric machine comprising:
a rotor; and
a stator according to claim 1.

20. A motor vehicle comprising an electric machine according to claim 19.

* * * * *